Feb. 1, 1938.  F. H. PAQUIN  2,106,854
APPLICATOR GRID FOR CEMENTING MACHINES
Filed Dec. 14, 1936  2 Sheets-Sheet 1
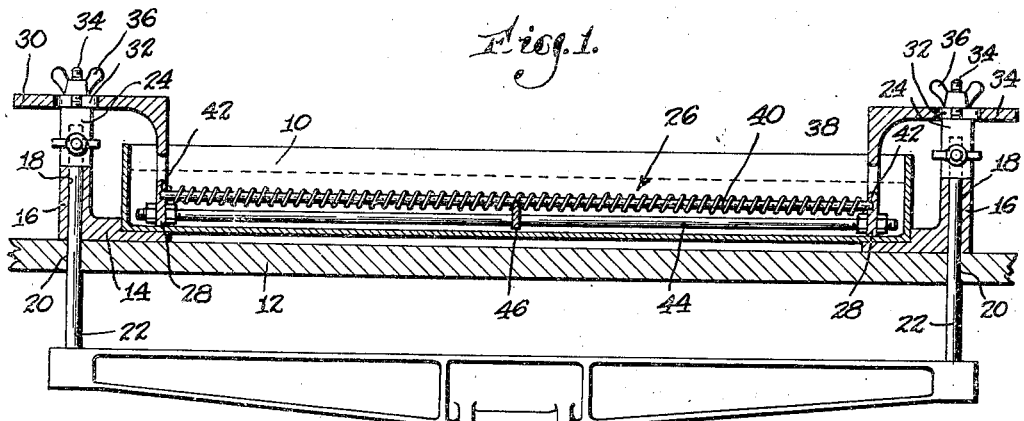
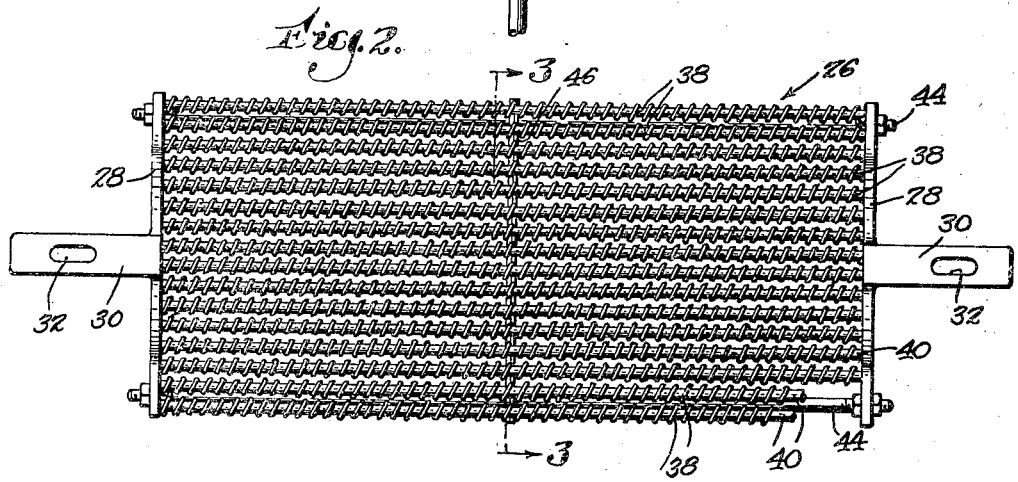
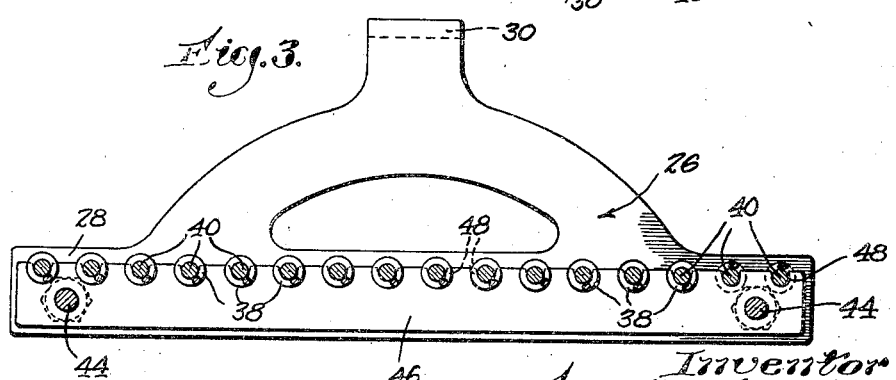
Inventor
Frank H. Paquin
by Everett Kent
Attorney Feb. 1, 1938. F. H. PAQUIN 2,106,854
APPLICATOR GRID FOR CEMENTING MACHINES
Filed Dec. 14, 1936 2 Sheets-Sheet 2

Inventor
Frank H. Paquin
by Everett Kent
Attorney

Patented Feb. 1, 1938

2,106,854

UNITED STATES PATENT OFFICE 2,106,854

APPLICATOR GRID FOR CEMENTING MACHINES

Frank H. Paquin, Groveland, Mass.

Application December 14, 1936, Serial No. 115,688

8 Claims. (Cl. 91—47)

This invention relates to improvements in applicator grids for cementing machines.

More particularly it provides an improved grid for distributed application of liquid cement to sheet materials and the like, having due regard for the need that the treated surface shall acquire effective adhesive quality, but improved by exercising economies in the quantity of cement applied to a given area of surface.

Cementing machines of the general type to which the invention relates have a container for holding a supply of cement, and an applicator grid. The latter is movable between a submerged position, where it becomes charged with cement, and an elevated position, to which it rises from the cement supply, for applying its charge upward against the surface which is to be cemented. Such machines, instead of coating the full area of surface, distribute the cement over that surface in dabs which are in the form of spots or lines.

Heretofore, it has been proposed to employ applicator grids which have a series of spaced thin bars, set with cement-carrying edges faced upward; or which have upstanding teeth, distributed over the grid, each tooth having a flat top and being intended to carry upward a relatively small quantity of cement resting on its top. Such bars apply cement in lines; the teeth apply it in small dots. Defects of these are that the bars apply too much cement. The teeth apply less, for each row of teeth is a row of fractions of a bar, but the making of the teeth is expensive, and the amount of cement they apply is usually still too large, and is not adjustable.

My present invention provides for distributive dabbing in spots, with economy of cement; with more control; and with a construction which is relatively inexpensive.

It is a feature of the invention that a multiplicity of curviform crests stand distributed over the area of my applicator grid. As the grid rises from its submergence in the cement supply, that which would be an excess of cement runs down the curvilinear surfaces from the crest of each unit; and yet each said crest retains a minute depth of cement at its top, and has the ability to draw more cement into the top, if the operator demands it, as may be done by suitable manipulation.

One feature is the ability to control the spreading of the cement, to a degree, if more than the minimum of dabs is desired, by extending the initial dabs in straight or curved lines on the surface which is being treated; and doing this with no possibility that irregularities in the surface which is being treated may catch on teeth or points of the applicator.

Another feature is the inherent simplicity and low cost of manufacture of the grid structure.

These objects and results are attained by mounting the curviform elements in suitably spaced positions over the full area of the applicator grid. Preferably they will be all in the same plane, arranged in parallel rows. For moving the grid, between submerged and elevated positions, the usual means or any other suitable means may be employed; and this may conveniently be attached to the grid frame so as to leave the full area of top of grid open for contact with the surface above, to which the cement is to be applied.

In a preferred embodiment, the curviform dabbing units, spread over the grid, may be the crests of helical coils of wires which have a multiplicity of convolutions extending along parallel rectilinear axes, with each crest of a convolution constituting one of the curviform cement-carrying surfaces. The coils may be suitably supported underneath to prevent sagging, if desired; or, if desired, each coil may have a stiff core rod extending axially through it, assuring also against lateral displacement.

It is intended that the patent shall cover, by suitable expression in the appended claims, whatever features of patentable novelty exist in the invention disclosed.

In the accompanying drawings:

Figure 1 is an elevation of a portion of a conventional type of cementing machine, in medial longitudinal section, having an embodiment of my improved applicator grid;

Figure 2 is a top plan of the applicator grid of Figure 1;

Figure 3 is an elevation, in section on 3—3 of Figure 2;

Figure 4:
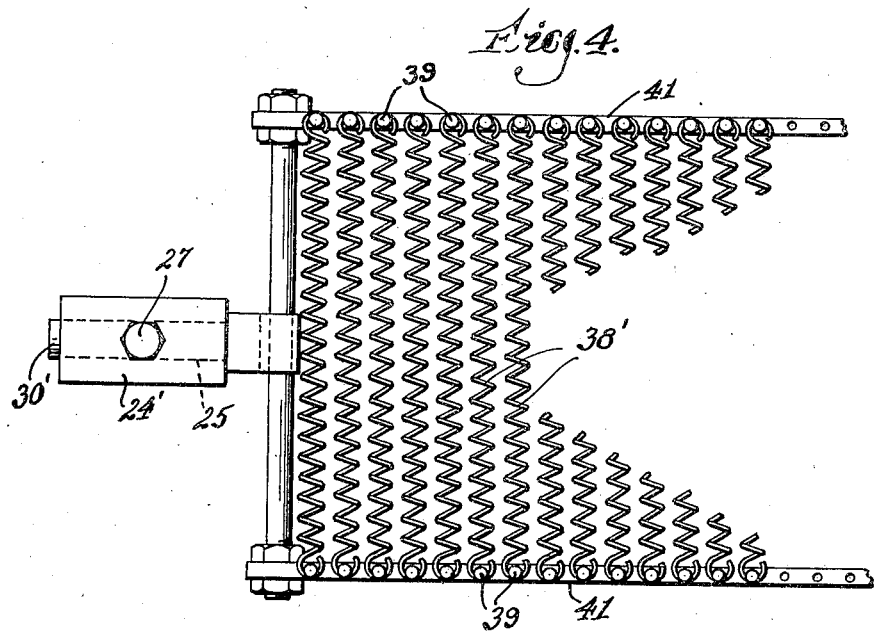
Figure 4 is a plan of a fragment of a modified form of grid, in which the wire coils extend crosswise of the grid.

Referring to the drawings, an ordinary pan type of container 10, resting on a table or other supporting bed 12, is adapted to hold a suitable supply of cement. Ordinarily the container rests loosely on a frame 14 which may be secured to table 12, and which has the two bosses 16, 16 rising beside the container, at opposite ends or sides. Each boss 16 has a hole 18 extending vertically through it, from top to bottom, for registering with one of two holes 20, 20 which extend through table 12. These holes are guides for the up and down travel of the upright rods 22 of an U-shaped actuator, positioned under the table 12. Caps 24, 24 secured over the top ends of rods 22, 22, constitute stops for limiting downward movement of the actuator.

Any suitable means may be employed for lifting and lowering the actuator, at will, as for example a foot pedal (not shown).

The invention has to do with the applicator grid 26 which is mounted for movement between its submerged position of Figure 1 and an elevated position in which the small bodies of cement carried on its crests may be transferred to a sheet of leather, for example, as dabs on the surface thereof. The grid 26 is shown hung on the caps 24, 24 so that it moves in unison with the actuator rods 22, 22. The hangers as seen in Figure 1 are inverted L-shaped end plates whose vertical limbs 28, 28 reach up out of end portions of the container, and whose horizontal limbs 30, 30 rest on the respective caps 24, 24. Each horizontal limb 30, 30 may have an elongated slot 32 for receiving loosely a threaded post 34 on a cap 24, and for permitting adjustment of the position of the grid within the container. Wing nuts 36, 36 on the respective cap-posts 34, 34 may be tightened to make the grid secure on the actuator rods.

The bottoms of these end plates are as broad as the grid is, as seen in Figures 2 and 3. A series of helixes 38 of wire extend between the plates 28, 28, all in the same plane, and in slightly spaced parallel relation. Each helix 38 may have a core rod 40 extending axially through it, with opposite ends seated in slight recesses 42, in the respective plates 28, 28. The core rods 40 are made secure in their respective end seats by tie rods 44 which clamp the plates 28, 28 against the ends of the coils. By placing the tie rods along each side edge of grid, close under the coils 38, two such rods suffice for making the grid assemblage firm and secure. Each coil 38 extends from one plate 28 to the other.

Ordinarily the core rods 40 will provide whatever stiffness is desired for the coils 38, but one may employ in addition a cross bar 46 extending in supporting relation under the coils 38. This cross bar may be located mid-way along the grid, strung on the tie rods 44. It may be notched as at 48, along its upper edge, to receive the respective coils, thereby to ensure against lateral relative displacement of coils as well as providing under support therefor. If the coils 38 are stable and stiff, this cross-support 46 may provide adequate support without the core-rods 40.

Figure 5:
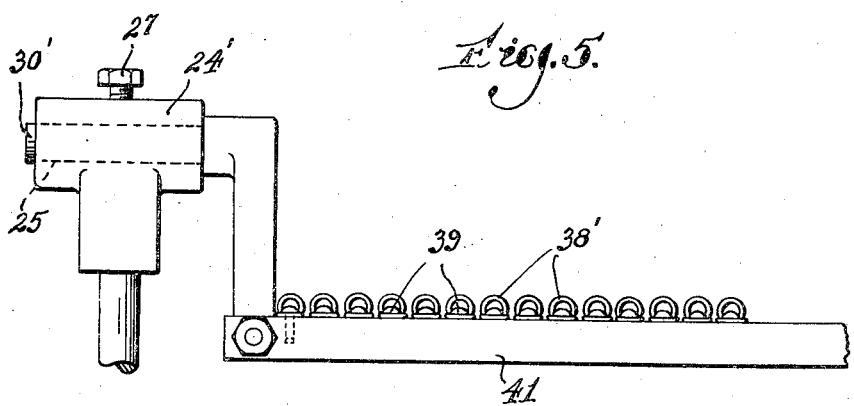
Figure 5 is an elevation of the device of Figure 4.

The invention relates more particularly to the structure which provides the distributed curviform dabbing surfaces, all in the same plane. Various changes may be made in the details of the mounting structure without departing from the spirit and scope of the invention. For example, Figures 4 and 5 show shorter coils 38' which can be stiff enough without core rods or other intermediate supports. These may be mounted in parallelism in the shorter direction across the grid, with each coil individually secured at its ends to the grid frame 41, such as by hooking the coil ends around suitable retaining elements 39 on the frame. Also, in place of the slotted horizontal limbs of L pieces 30, 30, cylindrical rods or stub shafts 30', 30' may be employed, in which case the caps 24', 24' would be T-shaped, each with a horizontal bore 25 for receiving the stub shaft, and with means 27 for fixing the said stub shaft against rotary or lateral movement relative to its cap bearing.

The grid is of simple construction, including inexpensive parts which may be assembled easily and quickly to make a grid element far superior to all prior grids of which I am aware. The simple structure as herein illustrated in Figures 1–3 enables the lifting out of a particular coil whenever desired by merely loosening the tie bolts a little to permit springing out of the particular core-rod with its accompanying coil. The other coils and core-rods continue in proper position until the tie bolts are again tightened. In the form of Figures 4, 5, a coil may be removed by unhooking its ends.

In operation cement is transferred from the curviform crests of the grid area, to the under surface of the leather, canvas, veneer, or other material, by setting the sheet of material into contact with those crests when they have been freshly raised from the bath of cement. The crests of the wire coils are curviform in two directions, viz, in the direction of length of wire and in the direction around the wire, the latter being a curve of very short radius, whatever the size of the wire may be. Some of the liquid cement which would remain on the crest, if the crest were flat, drains down the two curves, descending laterally from the crest very quickly and down the length of the wire more slowly; but nevertheless some is held on the crest by adhesion to the metal of the wire, and other adhering to that by cohesion of the liquid. But this leaves on each crest a smaller body of cement than if the crest were flat, and so less is applied to the sheet of material. However the amount transferred to that sheet can be controlled, to an extent, because the cement lies as a film over the whole body of metal adjacent to the crest and has some cohesive strength so that when that cement on the crest is withdrawn by moving the crest slightly over the contacted surface, some of that on the adjacent slope of the crest can be drawn back and applied from the crest.

I claim as my invention:

1. A cement applyng grid, comprising helixes of wire in which the crests of convolutions are distributed over the area of the grid and are spaced little distances apart in directions both along and across the grid, combined with a frame holding those helixes with their crests all in approximately the same plane, and means to raise and lower the frame relative to a cement container.

2. A cement applying grid, comprising parallel helical coils of wire in which the crests of convolutions are distributed over the area of the grid and are spaced little distances apart in directions both along and across the grid, approximately in the same plane; a pair of bars engaging opposite ends of the coils; and a pair of rods, extending parallel to the coils, securing the bars and coils as a unit.

3. A cement applying grid, comprising parallel helical coils of wire in which the crests of convolutions are distributed over the area of the grid and are spaced little distances apart in directions both along and across the grid, approximately in the same plane; a pair of bars at opposite ends of the coils; a stiff rod extending as a core through each coil and supported at its ends by said bars; and a pair of other rods extending parallel to the coils, securing the bars and core rods as a unit.

4. A cement applying grid, comprising helixes of wire in which the crests of convolutions are distributed over the area of the grid, spaced little distances apart in directions both along and across the grid; a frame supporting the coils with their crests approximately in the same plane; and means engaging each coil between its ends and preventing displacement of crests from their initial common plane.

5. A cement applying grid, comprising helically coiled elements distributed over the grid, whose convolutions have their crests spaced little distances apart in directions both along and across the grid in a common plane; each said crest having its surface curved in direction across as well as along the curvilinear extent of the convolution; and means securing said coiled elements in a predetermined relative arrangement.

6. A cement applying grid, having curviform crests distributively arranged over the area of the grid, spaced little distances apart in directions both along and across the grid, approximately in a common plane; and means holding them at that plane.

7. A cement applying grid, having curviform crests distributively arranged over the area of the grid, spaced little distances apart in directions both along and across the grid, approximately in a common plane.

8. Apparatus for applying cement comprising a reticulated body having a multiplicity of curviform crests of the body between the reticular openings thereof, said crests being spaced little distances apart in directions both along and across the body.

FRANK H. PAQUIN.